United States Patent [19]
Mori et al.

[11] Patent Number: 6,114,500
[45] Date of Patent: Sep. 5, 2000

[54] PURIFICATION OF ORGANIC SILICON POLYMER

[75] Inventors: Shigeru Mori; Yoshitaka Hamada, both of Usui-gun, Japan

[73] Assignee: Shin-Etsu Chemical Co., Ltd., Tokyo, Japan

[21] Appl. No.: 09/226,241

[22] Filed: Jan. 7, 1999

[30] Foreign Application Priority Data

Jan. 8, 1998 [JP] Japan .................................. 10-013330

[51] Int. Cl.$^7$ ........................................................ C08J 3/07
[52] U.S. Cl. .......................... 528/490; 528/499; 556/430; 556/431
[58] Field of Search .................................... 556/430, 431; 528/499, 490

[56] References Cited

U.S. PATENT DOCUMENTS 5,159,043  10/1992  Mori et al. ................................ 528/14

*Primary Examiner*—Robert Dawson
*Assistant Examiner*—Kim-Liang Peng
*Attorney, Agent, or Firm*—Millen, White, Zelano & Branigan, P.C.

[57] ABSTRACT

An organic silicon polymer is purified by washing at least once a solution of an organic silicon polymer with aqueous hydrochloric acid having a concentration of at least 0.001 N, and washing the solution at least twice with ultrapure water having a resistivity of at least 10 MΩ/cm. Metal impurities can be removed from the organic silicon polymer to a sufficient level for use as electronic material without detracting from the polymer's own properties.

14 Claims, No Drawings

6,114,500

PURIFICATION OF ORGANIC SILICON POLYMER

This invention relates to a method for purifying an organic silicon polymer such as polysilane by removing metal impurities to a sufficient level for use as electronic material.

BACKGROUND OF THE INVENTION

In the past, polysilane materials drew an attention due to their unique chemical and optical properties. They were expected to find use as conductive materials, photoconductive materials and non-linear optical materials, but have not been developed to a sufficient level to find a commercial application. One of the reasons is that polysilane and other organic silicon polymers having a basic skeleton of Si-Si bonds are often synthesized by Wurtz reaction of chlorosilanes with alkali metals such as metallic sodium under conditions that would cause ionic by-products to form. Incomplete removal of such impurities restricts the use of organic silicon polymers in the electronic material application.

Therefore, an object of the invention is to provide a method for purifying an organic silicon polymer by removing metal impurities from the organic silicon polymer through simple steps to a sufficient level for use as electronic material without detracting from the polymer's own properties.

SUMMARY OF THE INVENTION

Regarding a method for purifying polysilane and other organic silicon polymers that are synthesized by Wurtz reaction and thus contain ionizable metal impurities, we have found that the ionizable metal impurities can be efficiently removed from the polymer by dissolving the polymer in a non-polar solvent such as toluene, and washing the resulting solution with aqueous hydrochloric acid, then with ultrapure water.

According to the invention, there is provided a method for purifying an organic silicon polymer, comprising the steps of washing at least once a solution of an organic silicon polymer with aqueous hydrochloric acid having a concentration of at least 0.001 N, and washing the solution at least twice with ultrapure water having a resistivity of at least 10 MΩ/cm, thereby removing metal impurities from the organic silicon polymer.

According to the invention, ionic impurities can be removed from the organic silicon polymer to a sufficient level for the polymer to find use as an electronic material. While ionic impurities or metal impurities are deleterious in utilizing polysilane and other organic silicon polymers as conductive materials, photoconductive materials and non-linear optical materials, the invention is effective for removing such ionic impurities or metal impurities from the organic silicon polymers without causing decomposition of the polymers.

DESCRIPTION OF THE PREFERRED EMBODIMENTS

The purifying method of the invention is applicable to all types of organic silicon polymers containing ionic metal impurities to be removed, including not only polysilanes, especially polysilanes resulting from the Wurtz process and polycarbosilanes resulting from the Wurtz reaction, but also organic silicon polymers resulting from the ring-opening polymerization process and anionic polymerization process. These polymers may have linear or branched structures insofar as they are soluble in organic solvents. The washing steps according to the invention do not cause cleavage of Si-Si bonds in the backbone and side chain groups which can be otherwise cleaved by hydrochloric acid, such as phenyl and hydroxyl groups on silicon atoms. The polymer may have any desired degree of polymerization although the inclusion of at least two Si-chains is preferred. Polymers having a weight average molecular weight of about 500 to about 500,000 are preferable. However, the degree of polymerization and molecular weight are not limited to this range. Where the polymer contains gel-like by-products, such by-products are removed before washing.

If the organic silicon polymer is liquid, it may be directly washed according to the invention, but preferably after dissolving or diluting in an organic solvent. If the organic silicon polymer is solid, it is dissolved in an organic solvent before it is washed according to the invention. Use may be made of the organic solvents in which the organic silicon polymer is soluble. Toluene and xylene are typical solvents. The concentration of the organic silicon polymer in the organic solvent may be selected as appropriate although a concentration of 5 to 40% by weight, especially 10 to 20% by weight is preferred.

According to the invention, the solution of the organic silicon polymer is first washed with aqueous hydrochloric acid. During the step of contacting with aqueous hydrochloric acid, ionizable metal impurities can be ionized and dissolved in water and thus removed. Then washing with aqueous hydrochloric acid is especially effective for the removal of iron values. As the aqueous hydrochloric acid, the use of concentrated hydrochloric acid is acceptable because it causes no substantial decomposition of the polymer and hence, no alteration of the polymer properties. Even diluted hydrochloric acid is effective for efficient removal of metal ions. However, a too low concentration of hydrochloric acid is inefficient in removing metal impurities. For this reason, the concentration of aqueous hydrochloric acid is adjusted to at least 0.001 N, preferably 0.01 to 2 N, more preferably 0.1 to 1 N.

The step of washing with aqueous hydrochloric acid may be carried out by well-known liquid washing techniques, for example, using a separatory funnel or a shaking machine. In a single cycle of washing with aqueous hydrochloric acid, about 10 to 200 parts, especially about 30 to 50 parts by weight of aqueous hydrochloric acid may be used per 100 parts by weight of the polymer solution. The number of hydrochloric acid washing cycles is at least 1, especially 1 or 2.

According to the invention, the hydrochloric acid washing step is followed by washing with ultrapure water because only the hydrochloric acid washing step fails to achieve sufficient removal of ionic impurities, especially sodium. As used herein, ultrapure water is water having a resistivity of at least 10 MΩ/cm. The washing technique may be selected from the same techniques as above. In a single cycle of washing with ultrapure water, about 30 to 300 parts, especially about 50 to 100 parts by weight of ultrapure water may be used per 100 parts by weight of the polymer solution.

Washing with city water may be carried out subsequent to the hydrochloric acid washing step or between the hydrochloric acid washing step and the ultrapure water washing step although the subsequent ultrapure water washing step is essential because impurities can be introduced from city water. It is understood that repeating only ultrapure water washing many times can, of course, achieve purification to an equivalent level. However, frequent repetition of ultrapure water washing is impractical because ultrapure water washing is less effective for the removal of less ionizable metal values and it is industrially desirable to obtain the desired product by a less number of washing steps. The number of ultrapure water washing cycles is at least 2, preferably two to several although it depends on the content of metal impurities in the polymer solution and the hydrophilicity of the solvent.

According to the invention, metal impurities can be removed from polysilanes and other organic silicon polymers to a sufficient level for use as electronic material without detracting from the polymers, own properties. The application of organic silicon polymers is thus widened.

EXAMPLE

Examples of the invention are given below by way of illustration and not by way of limitation.

Example 1 & Comparative Examples 1–5

A polymer (methylphenylsilane) was synthesized by Wurtz reaction and purified by re-precipitation from toluene/methanol. This polymer was purified by various methods for comparing the results of purification. The sample used was 100 g of a 10% by weight solution of the polymer in toluene. Each sample was washed the predetermined times with 50 g of the washing solution shown in Table 1, and re-precipitated from toluene/methanol again, obtaining a purified product.

The washing conditions and the results of metal analysis of the purified products are shown in Table 1.

TABLE 1

| Sample No. | CE1 0 | CE2 1 | CE3 2 | CE4 3 | CE5 4 | E1 5 |
|---|---|---|---|---|---|---|
| Na (ppm) | 6.9 | 2.3 | 0.5 | 4.5 | 4.0 | <0.1 |
| K (ppm) | <0.1 | <0.1 | <0.1 | <0.1 | <0.1 | <0.1 |
| Fe (ppm) | 1.0 | 1.0 | 0.2 | 0.1 | 0.2 | <0.1 |
| Al (ppm) | 1.0 | 1.0 | <0.1 | <0.1 | <0.1 | <0.1 |
| Cu (ppm) | 0.4 | 0.3 | <0.1 | <0.1 | <0.1 | <0.1 |
| Cr (ppm) | <0.1 | <0.1 | <0.1 | <0.1 | <0.1 | <0.1 |
| Ni (ppm) | <0.1 | <0.1 | <0.1 | <0.1 | <0.1 | <0.1 |

Sample 0: polysilane prior to purification
Sample 1: washed 5 times with city water
Sample 2: washed 5 times with ultrapure water (resistivity 15 MΩ/cm)
Sample 3: washed once with 12N hydrochloric acid
Sample 4: washed once with 1N hydrochloric acid
Sample 5: washed once with 1N hydrochloric acid, then 3 times with ultrapure water As compared with the metal contents prior to washing, the residual metal contents after washing were reduced in all the samples, but largely differed among different washing methods. In the case of city water washing (Comparative Example 2), the reduction of sodium content was fair, but not sufficient, and the removal of iron and copper was inefficient. By repeating ultrapure water washing (Comparative Example 3), the metal contents were generally reduced. However, for the removal of sodium which was originally contained in a large content, 5 times of ultrapure water washing was still insufficient. Also, the removal of metals which are unlikely to ionize such as iron was inefficient and did not reach the level for use in the electronic material application. Washing with hydrochloric acid (Comparative Examples 4 and 5) was effective for the removal of iron and copper, but not for sodium. A combination of hydrochloric acid washing with ultrapure water washing (Example 1) was effective for the removal of metals without a need to increase the number of washing steps.

Example 2

A 10% by weight toluene solution of a polymer (phenylsilane) was washed once with conc. hydrochloric acid, then four times with ultrapure water. By these washing steps, the sodium and iron contents of 0.6 ppm and 0.5 ppm prior to washing were both reduced to less than 0.1 ppm. The IR and GPC analysis results of the polymer remained unchanged before and after purification.

Comparative Example 6

A 10% by weight toluene solution of a polymer (phenylsilane) was washed five times with ultrapure water. Prior to washing, the sodium and iron contents were 0.6 ppm and 0.5 ppm, respectively. By these washing steps, the sodium content was reduced to less than 0.1 ppm, but the iron content was merely reduced to 0.3 ppm.

Japanese Patent Application No. 013330/1998 is incorporated herein by reference.

Reasonable modifications and variations are possible from the foregoing disclosure without departing from either the spirit or scope of the present invention as defined by the claims.

What is claimed is:

1. A method for purifying an organic silicon polymer, comprising the steps of:

washing at least once a solution of an organic silicon polymer with aqueous hydrochloric acid having a concentration of at least 0.001 N, and washing the solution at least twice with ultrapure water having a resistivity of at least 10 MΩ/cm, thereby removing metal impurities from the organic silicon polymer.

2. The method of claim 1 wherein said organic silicon polymer is a solvent-soluble polysilane having a linear or branched structure.

3. The method of claim 1 wherein said organic silicon polymer is a solvent-soluble polycarbosilane containing a silicon-to-silicon bond and having a linear or branched structure.

4. The method of claim 1 wherein said organic silicon polymer is a polysilane or polycarbosilane resulting from the Wurtz process.

5. The method of claim 1 wherein said organic silicon polymer is obtained from a ring opening polymerization process or an anionic polymerization process.

6. The method of claim 1 wherein said organic silicon polymer has an average molecular weight of 500 to 5000.

7. The method of claim 1 wherein said organic silicon polymer is contained in a solvent in a concentration of 5 to 40% by weight.

8. The method of claim 7 wherein the concentration of said organic silicon polymer in the solvent is 10 to 20% by weight.

9. The method of claim 1 wherein the concentration of aqueous hydrochloric acid is 0.1 to 2 N.

10. The method of claim 1 wherein the concentration of aqueous hydrochloric acid is .1 to 1 N.

11. The method of claim 1 wherein the solution is washed with 30 to 300 parts of ultrapure water per 100 parts by weight of polymer solution.

12. The method of claim 1 wherein the solution is washed with 50 to 100 parts by weight of ultrapure water per 100 parts by weight of polymer solution.

13. The method of claim 1 wherein the solution is washed with 10 to 200 parst by weight of aqueous hydrochloric acid per 100 parts by weight of polymer solution.

14. The method of claim 1 wherein the solution is washed with 30 to 50 parts by weight of aqueous hydrochloric acid per 100 parts by weight of polymer solution.

* * * * *